(12) United States Patent
Kim et al.

(10) Patent No.: US 10,727,710 B2
(45) Date of Patent: Jul. 28, 2020

(54) MOTOR

(71) Applicant: LG Electronics Inc., Seoul (KR)

(72) Inventors: Jaeho Kim, Seoul (KR); Byungkuk Kam, Seoul (KR); Chisung Park, Seoul (KR); Jihyun Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 107 days.

(21) Appl. No.: 15/887,475

(22) Filed: Feb. 2, 2018

(65) Prior Publication Data

US 2018/0226850 A1    Aug. 9, 2018

(30) Foreign Application Priority Data

Feb. 3, 2017   (KR) .......................... 10-2017-0015376

(51) Int. Cl.
| | | |
|---|---|---|
| *H02K 1/27* | (2006.01) | |
| *H02K 1/28* | (2006.01) | |
| *H02K 15/03* | (2006.01) | |

(52) U.S. Cl.
CPC ............ *H02K 1/2773* (2013.01); *H02K 1/28* (2013.01); *H02K 15/03* (2013.01); *H02K 1/2786* (2013.01)

(58) Field of Classification Search
CPC .... H02K 1/2773; H02K 15/03; H02K 1/2786; H02K 1/00–1/34
USPC .......................... 310/156.01, 156.15, 216.053
See application file for complete search history.

(56) References Cited

U.S. PATENT DOCUMENTS

2012/0112591 A1* 5/2012 Feuerrohr ............ H02K 1/2773
                                                       310/156.15
2016/0049837 A1* 2/2016 Helbling .................. H02K 1/30
                                                       310/156.22

FOREIGN PATENT DOCUMENTS

| CN | 102449881 | 5/2012 |
| CN | 204481590 | 7/2015 |
| EP | 2600500 | 6/2013 |
| KR | 20130027417 A | * 3/2013 |
| KR | 1020130027417 | 3/2013 |

OTHER PUBLICATIONS

Machine Translation, Woo et al., KR-20130027417-A, Mar. 2013. (Year: 2013).*
Chinese Office Action in Chinese Application No. 201810112557.2, dated Aug. 26, 2019, 16 pages (with English translation).

* cited by examiner

*Primary Examiner* — Thomas Truong
(74) *Attorney, Agent, or Firm* — Fish & Richardson P.C.

(57) ABSTRACT

A motor includes a stator, a rotor including an outer rotor core that includes a plurality of magnets arranged along a circumferential direction of the rotor, an inner rotor core that is located radially inward of the outer rotor core and that defines a shaft hole configured to receive a shaft, and an inner connecting portion that connects the outer rotor core to the inner rotor core and that is located at a central axis of a magnet from among the plurality of magnets. The inner connecting portion includes a radial rib that extends from the inner rotor core radially outward toward the outer rotor core, and an extension rib that extends from an outer end of the radial rib in the circumferential direction and that defines an angle with respect to the radial rib that is greater than or equal to 90 degrees.

20 Claims, 8 Drawing Sheets

MOTOR

CROSS-REFERENCE TO RELATED APPLICATIONS

This application claims priority to Korean Patent Application No. 10-2017-0015376, filed on Feb. 3, 2017, in Korea, the entire contents of which is hereby incorporated by reference in its entirety.

FIELD

The present disclosure relates to a motor, and more particularly, a spoke type permanent magnet motor having an improved mechanical hardness.

BACKGROUND

A motor may transmit rotational force of a rotor to a shaft that drives a load. For example, the shaft may be connected to a drum of a washing machine and be configured to drive the drum. As another example, the shaft may be connected to a fan of a refrigerator and be configured to drive the fan to supply cold air to cool a space. In some examples, the motor may be used in a compressor to compress refrigerant.

A rotor is rotatable in a motor by an electromagnetic interaction with a stator. For example, a coil may be wounded around the stator, and the rotor may rotate with respect to the stator as an electric current is applied to the coil.

The stator may include a stator core, and the stator core may be made of a conductor. In some examples, the stator may be fixed to an object such as a motor housing, a motor bracket, or a tub of a washing machine by another coupling structure for fixing the stator to the object.

The rotor may have various types including a permanent magnet type.

For example, the permanent magnet type rotor may include a SPM (Surface Permanent Magnet) type rotor in which a permanent magnet is arranged in an outer circumferential surface of the rotor, and an IPM (Interior Permanent Magnet) type rotor in which a permanent magnet is arranged in the rotor. The SPM rotor uses only a magnetic torque generated by the permanent magnet. The IPM rotor may use not only the magnetic torque but also a reluctance torque generated by a magnetic resistance difference. The IPM type rotor may accompany an increase of the manufacturing cost, while having a wider operation area.

The IPM motor may include a spoke type permanent magnet motor. In the spoke type permanent magnet motor, permanent magnets are embedded in both ends of one pole in symmetry. A magnetic polarity may be formed by a structure including a core surface between the permanent magnetics. An increase of gap flux density may generate a high torque and a high output. In some cases, an advantage of the IPM motor may include a slim motor design for the same output and a high price competitiveness.

FIG. 1 illustrates a conventional spoke type permanent magnet motor in the related art.

The motor 1 includes a stator 10 and a rotor 20.

The stator 10 may include a stator core 11, and a plurality of teeth 12 projected from the stator core 11 in a radial direction. The stator core 11 may be formed in a ring shape.

A pole shoe 13 extends from an inner radial end of the teeth 12 in both circumferential directions. A slot 14 is formed between two teeth so that the coil may be wounded by the teeth and the slot 14.

The rotor 20 includes a rotor core. The rotor core has an outer diameter core 21, an inner diameter core 22, and an inner diameter connecting portion 40. A permanent magnet loading portion 24 may be formed in the outer diameter core 21, and a permanent magnet 25 longitudinally may be loaded in the permanent magnet loading portion 24 in a radial direction. The outer diameter core 21 may be referred to as the outer core, and the inner diameter core 22 may be referred to as the inner core, because the inner diameter core 22 is located in an inner area with respect to a radial direction of the outer diameter core 21.

In some examples, the permanent magnet 25 may be loaded in a circumferential direction, and a gap 30 may be formed in the outer diameter core 21 between the permanent magnets 25. The loading directions of the permanent magnets facing each other in the circumferential direction are in opposite.

Loading projections 31 may be formed inside and outside of the permanent magnet loading portion 24 with respect to the radial direction.

Connection gaps 27 and 29 may be formed between the outer diameter core 21 and the inner diameter core 22. The rotor core is integrally formed as one body so that a radial rib 26 may connect the outer diameter core 21 and the inner diameter core 22 to each other and cross the connection gaps 27 and 29 in a radial direction. A circumferential rib 28 may be formed in a middle area of the radial rib 26. The inner diameter connecting portion 40 may include the radial rib 26 and the circumferential rib 28.

The circumferential rib 28 may partition the gap into the connection gaps in the radial direction, specifically, the outer connection gap 27 and the inner connection gap 29 that is located radially inward of the outer connection gap 27.

A shaft hole 23 configured to receive the shaft may be formed in the center of the inner diameter core 22.

In the spoke type motor, the coordinate system expressed as three phases of U, V and W may be converted into D-Q axis rectangular coordinates to show the physical quantity of the motor by using two variables and perform the instantaneous control.

For example, the D-axis is an axis for generating the magnetic flux of the motor and is set as a direction of the magnetic flux generated in the U-axis winding. Accordingly, D-axis may be a reference axis of vector control.

The Q-axis is orthogonal to the D-axis as the axis of the currents which generates a torque in the vector control. Accordingly, the Q-axis is controlled in case of controlling currents.

For example, the center axis of the rotor core (e.g., an axis extending from the center of the rotor to a circumferential center of the rotor core) may be the D-axis, and the center axis of the permanent magnet (e.g., an axis extending from the center of the rotor to a circumferential center of the permanent magnet) may be the Q-axis.

The inner diameter connecting portion 40, for example, the radial rib 26 is located on the D-axis in the spoke type motor shown in FIG. 1. In this case, the thickness of the radial rib 26 affects the flux leakage and the mechanical rigidity. For example, as a circumferential-direction width the radial rib 26 becomes thicker and thicker, more flux leakage, which may be irrelevant to the performance of the motor, may be generated and deteriorate the efficiency of the motor, but the mechanical rigidity for connecting the outer diameter core 21 and the inner diameter core 22 with each other may be enhanced. Accordingly, the damage or breakage to the rotor caused by the twisting may be reduced.

FIGS. 2 and 3, respectively, show a diagram and a saturation degree of the magnetic flux in the inner diameter connecting portion 40 of the rotor shown in FIG. 1.

The leakage flux generated in the permanent magnets arranged in both sides with respect to the radial rib 26 may pass through the radial rib. The saturation degree of the magnetic flux in the radial rib becomes high, because the leakage flux generated by the two permanent magnets 25 passes through a one radial rib 26. The leakage flux in the circumferential rib 28 and the inner diameter core 22 is distributed to two sides and the saturation degree of the magnetic flux in the core becomes low.

As shown in FIGS. 2 and 3, the amount of the leakage flux is variable according to the thickness (e.g., a circumferential width) of the radial rib 26. For example, as the radial rib 26 becomes thicker in the circumferential direction, the quantity of the leakage flux may increase. As the radial rib 26 becomes thinner, the mechanical rigidity may become noticeably low. In this example, the quantity of the leakage flux and the mechanical rigidity are related in an inverse proportion to each other.

While magnetic flux saturation is generated in the radial rib 26, magnetic flux is not saturated in the portion between the circumferential rib 28 and the inner diameter core 22 and in the inner diameter core 22. For example, not an entire are of the leakage flux movement passage is saturated. Accordingly, the leakage flux may be consistently generated, and which may not minimize the quantity of the leakage flux.

In other examples, a motor may include an inner diameter connecting portion in which the radial rib 26 is formed not in the D-axis but in the Q-axis.

For example, a spoke type motor may include a radial rib and connection bridges connected with both ends of the radial rib. The mechanical rigidity may be reinforced somewhat, but one more leakage flux passage is formed. While the radial rib located in a lower end of a permanent magnet becomes thicker, the mechanical rigidity may be reinforced, but the leakage flux passage becomes larger enough to increase the quantity of the leakage flux.

FIGS. 4 and 5, respectively, show a diagram of magnetic flux and a saturation degree of the magnetic flux in the inner diameter connecting portion in a related art.

As shown in the drawings, the inner diameter connecting portion 340 extends outwardly with respect to a radial direction, and includes the radial rib 326 that supports a center area of the permanent magnet 325, and extension ribs 327 formed in left and right areas of the radial rib 326. The extension rib 327 is curved to make a magnetic circuit become long. In this case, the magnetic resistance may be increased. There is a space 331 between the inner diameter connecting portions 340.

The radial rib 326 extends to contact with a radial inner surface of the permanent magnet 325 so that a predetermined area of the radial rib 326 may be located in an outer portion in a radial direction with respect to the extension rib 327.

The magnetic flux saturation degree of the leakage flux moving passage may be variable according to the thickness of the radial rib 326.

The magnetic flux may flow from one end of the extension rib 327 to the other end of the extension rib 327 opposite to the one end, after passing the radial rib 326. As shown in the drawing, the magnetic flux saturation is generated only in the extension rib 327, not in the radial rib 326 arranged between the extension ribs 327. Accordingly, the leakage flux is consistently generated and it may be limited to minimize the quantity of the leakage flux because the entire area of the leakage flux moving passage is not saturated.

FIGS. 6 and 7, respectively, show a diagram of magnetic flux and a saturation degree of the magnetic flux in the inner diameter connecting portion in another related art. In this example, supporting ribs 328 are further provided in both sides of the radial rib 326 to reinforce the strength of the inner diameter connecting portion.

In this example, the magnetic flux saturation degree of the leakage flux moving passage is variable according to the thickness of the radial rib 326.

The magnetic flux flows from one extension rib 327 to the other extension rib 327 after passing the radial rib 326. The magnetic flux flows from one supporting rib 328 to the other supporting rib 328, after passing the radial rib 326.

As shown in the drawings, the magnetic flux saturation is generated only in the extension ribs 327 and the supporting ribs 328, not in the radial rib 326 provided between them. Accordingly, the entire leakage flux moving passage is not saturated so that the leakage flux may be consistently generated and it may be limited to minimize the quantity of the leakage flux.

Accordingly, it may be of interest to provide a motor (e.g., a spoke type motor), which is capable of enhancing the motor efficiency by minimizing the leakage flux and also reinforcing the mechanical rigidity.

SUMMARY

The present disclosure may provide a motor which may realize the minimizing of leakage passage by proposing a new structure supporting a permanent magnet and the leakage flux decrease caused by local magnetic flux saturation.

The present disclosure may also provide a motor which is capable of stably supporting a permanent magnet, while not used as a magnetic flux leakage passage, by proposing a structure configured to support a permanent magnet.

The present disclosure may also provide a motor which is capable of preventing the rotor deformation and damage caused by a centrifugal force by the securing of the mechanical rigidity of an inner diameter connecting portion for connecting an outer rotor core and an inner rotor core.

According to one aspect of the subject matter described in this application, a motor includes a stator, a rotor including an outer rotor core that includes a plurality of magnets arranged along a circumferential direction of the rotor, an inner rotor core that is located radially inward of the outer rotor core and that defines a shaft hole configured to receive a shaft, and an inner connecting portion that connects the outer rotor core to the inner rotor core and that is located at a central axis of a magnet from among the plurality of magnets. The inner connecting portion includes a radial rib that extends from the inner rotor core radially outward toward the outer rotor core, and an extension rib that extends from an outer end of the radial rib in the circumferential direction and that defines an angle with respect to the radial rib that is greater than or equal to 90 degrees.

Implementations according to this aspect may include one or more of the following features. For example, the radial rib may be located radially inward of the extension rib and extends along a radial direction of the rotor. In some examples, an entire area of the radial rib may be located radially inward of the extension rib, and the outer rotor core, the extension rib, the radial rib, and the inner rotor core are arranged along the radial direction in order. In some examples, the outer rotor core, the extension rib, the radial rib, and the inner rotor core may be integrally formed of a same material. A width of the radial rib in the circumferential direction may be greater than a width of the extension rib in the circumferential direction or a thickness of the extension rib in the radial direction. In some cases, the angle between the extension ribs and the radial rib may be 180 or less.

In some implementations, the inner connecting portion may have a Y-shape, and the extension rib may branch from the outer end of the radial rib in a first side of the radial rib and in a second side of the radial rib opposite to the first side. In some examples, the inner connecting portion may further include a supporting projection that protrudes from an outer end of the extension rib and that is configured to support the magnet. The supporting projection may include a plurality of projections, in which each projection is configured to support the magnet. For example, the supporting projection may include a pair of projections that supports both sides of an inner end of the magnet, respectively. The inner connecting portion may further include a middle gap defined by the extension rib, the supporting projection, and a surface of the magnet. In some examples, a width of the radial rib in the circumferential direction may increase along a radial direction toward the inner rotor core.

In some implementations, the inner connecting portion may include a plurality of connecting portions that are arranged along the circumferential direction and that define a connecting portion gap between the plurality of connecting portions, in which each connecting portion includes a round corner or a chamfer that defines a portion of the connecting portion gap, and the width of the radial rib increases toward the inner rotor core based on a decrease of a distance between round corners or chamfers across the connecting portion gap. The outer rotor core may define a loading slot configured to receive the magnet. A distance between the loading slot and the connecting portion gap may be equal to a thickness of the supporting projection in the radial direction, and to a width of the extension rib in the circumferential direction.

In some implementations, the inner connecting portion may have a T shape, and the extension rib may branch from the outer end of the radial rib in a first direction orthogonal to the radial rib and in a second direction opposite to the first direction. The extension rib may be configured to cover an inner area of the magnet, and define a portion of a loading slot configured to receive the magnet. A width of the radial rib in the circumferential direction may increase along a radial direction toward the inner rotor core. The inner connecting portion may include a plurality of connecting portions that are arranged along the circumferential direction and that define a connecting portion gap between the plurality of connecting portions, in which each connecting portion includes a round corner or a chamfer that defines a portion of the connecting portion gap, and the width of the radial rib increases toward the inner rotor core based on a decrease of a distance between round corners or chamfers across the connecting portion gap. In some examples, a distance between the loading slot and the connecting portion gap may be equal to a thickness of the extension rib in the radial direction.

According to another aspect, a motor includes an outer rotor core comprising a plurality of magnets, an inner rotor core located radially inward of the outer rotor core, and an inner connecting portion that connects the outer rotor core to the inner rotor core and that is located at a central axis of a magnet from among the plurality of magnets. The inner connecting portion includes a radial rib that extends from the inner rotor core radially outward toward the outer rotor core in a radial direction, and an extension rib that extends from an outer end of the radial rib toward both sides of the radial rib along a circumferential direction, that is connected to the outer rotor core, and that is located radially outward of the radial rib.

Implementations according to this aspect may include one or more of the following features. For example, a width of the radial rib in the circumferential direction may be greater than a width of the extension rib in the circumferential direction or a thickness of the extension rib in the radial direction. The extension rib may define an angle with respect to the radial rib that is greater than or equal to 90 degrees. In some cases, the angle between the extension ribs and the radial rib may be 180 or less.

For instance, when the radial rib and the extension ribs form the T shape, the angle formed by them may be 90 degrees. When they form the Y shape, the angle becomes larger than 90 degrees. The angle between the extension ribs and the angle between the extension ribs and the radial rib may be variable.

The angle between the extension ribs may be the angle defined in the radial-direction outer area. As coming from the T shape, which forms 180 degrees between the extension ribs, to the Y shape, the angle decreases from 180 degrees. The angel between the extension rib and the radial rib may be the angel in the radial-direction inner area. Coming from the T shape, which forms 90 degrees, to the Y shape, the angle increases from 90 degrees. In this case, the angle in the radial-direction outer area becomes smaller from 90 degrees.

The magnetic flux may flow from one extension rib to the other one. In this example, the flux saturation may be generated in the two extension ribs. However, magnetic flux saturation may not be generated in the connected area between the extension ribs, because the width or thickness can be increased at this area. With respect to a line connecting the centers of the extension ribs, the narrower width of the magnetic flux passage at the connecting area between the extension ribs may cause flux saturation. As the width of the flux passage becomes narrower, the flux resistance may increase and generate the flux saturation.

In some implementations, the flux expansion toward the radial-direction outer area in the connecting point between the extension ribs may be excluded, but only the flux expansion toward the radial-direction inner area may be allowable. For example, the width of the passage toward the radial-direction outer area is not expanded, but the width toward the passage toward the radial-direction inner area may be allowable only by the radial rib. Accordingly, the radial-direction outer area on the flux passage is blocked, and only the radial-direction inner area is expanded. The flux saturation is generated in more areas on the passage. However, in the related art, all of the radial-direction inner and outer areas are expanded. Accordingly, the flux saturation is not generated in the entire area on the passage.

The motor according to the disclosure is capable of minimizing the leakage flux generated by the inner diameter connecting portion. Also, the motor is capable of providing the more stable structure.

According to the present disclosure, the motor is capable of minimizing a leakage passage by a structure configured to support a permanent magnet and decreasing the leakage flux caused by local magnetic flux saturation.

The motor is capable of stably supporting a permanent magnet by a structure supporting a permanent magnet, which may not be a part of a magnetic flux leakage passage.

The motor may reduce rotor deformation and damage caused by a centrifugal force by securing of the mechanical rigidity of an inner diameter connecting portion that connects an outer rotor core and an inner rotor core.

Further scope of applicability of the present disclosure will become apparent from the detailed description given hereinafter. However, it should be understood that the detailed description and specific examples, while indicating example implementations of the disclosure, are given by illustration only, since various changes and modifications within the spirit and scope of the disclosure will become apparent to those skilled in the art from this detailed description.

DETAILED DESCRIPTION

Hereinafter, a motor in accordance with one implementation of the present disclosure will be described in detail, referring to the accompanying drawings.

Figure 8:
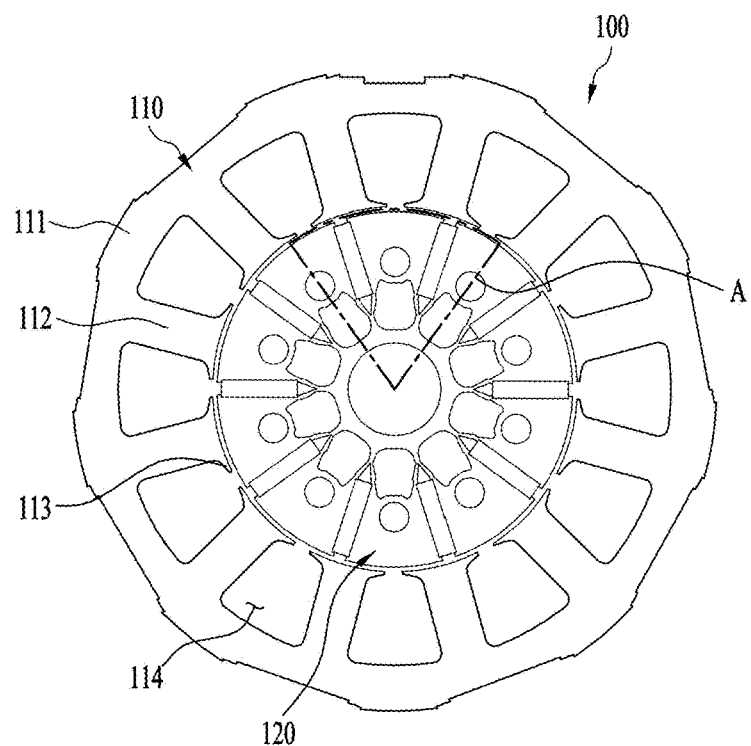
FIG. 8 illustrates an example motor in accordance with one implementation of the present disclosure.
Figure 9:
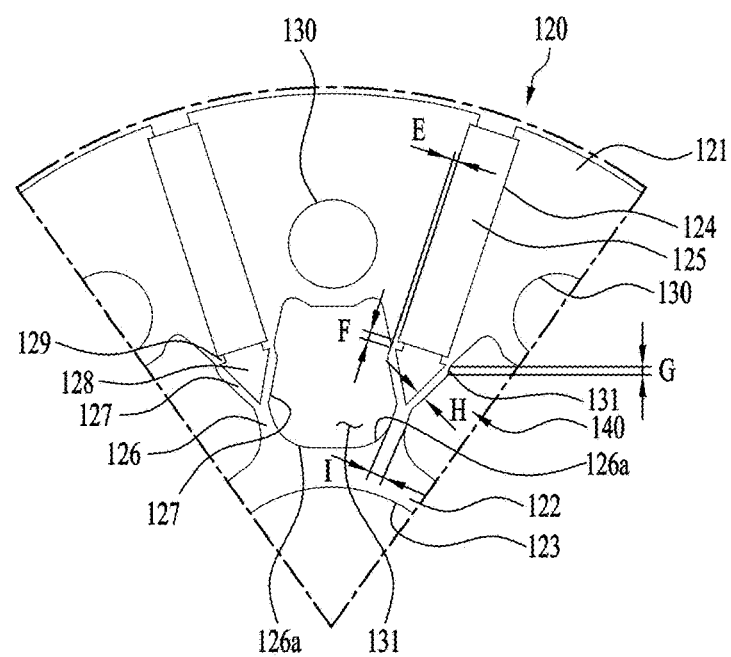
FIG. 9 is an enlarged view of an example rotor shown in FIG. 8.

FIG. 8 is a schematic plane view of an example motor in accordance with the implementation, and FIG. 9 is an enlarged view of "A" shown in FIG. 8.

As shown in the drawings, the motor 100 includes a stator 110 and a rotor 120. The rotor 120 is arranged in an inner area of the stator 110 with respect to a radial direction and rotatable with respect to the stator 110.

The stator 110 includes a stator core. The stator core may include a ring-shaped yoke 111, a plurality of teeth 112 projected from the yoke 111 inwardly in a radial direction, and a pole shoe 113 provided in each end of the teeth. A slot 114 is formed between each two of the teeth.

The rotor 120 is a spoke type, and a permanent magnet 125 may be mounted to the rotor 120. Accordingly, the motor 100 including the rotor 120 may be referred to as the spoke type permanent magnet motor.

The rotor 120 may include an outer rotor core 121 located at an outer radial surface of the rotor 120, and an inner rotor core 122 located at an inner radial surface of the rotor 120.

A permanent magnet 125 may be loaded to the outer rotor core 121, and a shaft may be coupled to the inner rotor core 122. A shaft hole 123 may be formed in the center of the inner rotor core 122, and a shaft may be inserted to and coupled to the shaft hole 123. A loading slot 124 is formed in the outer rotor core 121 to load the permanent magnet 125 therein. For example, the loading slot 124 is formed in a rectangular shape, and a rectangular-shaped permanent magnet may be inserted in the loading slot 124.

The loading slot 124 may have an area which is open outwardly with respect to the radial direction, and the other area which is closed inwardly with respect to the radial direction.

In some examples, the magnetic flux generated in the permanent magnet 125 flows in the radial direction after flowing in a circumferential direction. As the radial-direction-outer area of the loading slot 124 is open, the magnetic flux may be directed in the circumferential direction.

A gap 130 may be formed in the outer core 121. For example, the circumferential-direction magnetic flux is changed into a radial-direction magnetic flux by the magnetic resistance. The gap 130 may be provided between the two loading slots 124, for example, in a middle area between the two loading slots 124.

To enhance the performance of the motor, the magnetic flux passage may be generated between the stator 110 and the outer rotor core 121. For example, the magnetic flux generated in the inner rotor core 122 located in the inner area with respect to the radial direction may be a factor that deteriorates the motor performance. Therefore, the magnetic flux passage may be minimized between the outer core 121 and the inner core 122 to increase the performance of the motor. In examples where no magnetic flux passage is provided, the inner core 122 may be rotated together with the outer core 121, and a connecting structure may connect the inner core 122 and the outer core 121.

For example, an inner diameter connecting portion 140 may connect the outer core 121 and the inner core 122 with each other. As the inner diameter connecting portion 140 connects the outer core 121 and the inner core 122 with each other stably, generation of leakage flux may be minimized.

The outer rotor core 121 and the inner rotor core 122 may be fabricated by the blanking of an electric steel plate. Accordingly, steel plates with the planes shown in the drawings are multi-layered to form the rotor core. The inner diameter connecting portion 140 may be also integrally formed with the outer core 121 and the inner core 122 as one body, so that it may be a magnetic body in which magnetic flux flows.

In some examples, the outer core 121 and the inner core 122 are spaced apart from each other by a preset distance in the radial direction. Except the inner diameter connecting portion 140, the outer core 121 and the inner core 122 are not connected with each other. Accordingly, the number of the inner connecting portions 140 may be equal to the number of the permanent magnets 125, and a connecting portion gap 131 is formed between each two of the inner diameter connecting portions 140.

In some examples, the inner diameter connecting portion 140 may be located at the circumferential-direction center of the permanent magnet 125. In this case, the inner diameter connecting portion 140 is located on the Q-axis. The Q-axis may pass a central axis of the permanent magnet.

In this instance, the inner diameter connecting portion 140 may include a radial rib 126, and extension ribs 127 that extend from left and right sides of the radial rib 126. The outer core 121 and the inner core 122 may be connected with each other by the extension ribs 127 and the radial rib 126.

For example, the two extension ribs 127 extend to meet each other at the radial rib 126, and the radial rib 126 may extend from the meeting point toward the inner core 122. The radial rib 126 may extend toward the inner area with respect to the radial direction to be connected with the inner core. Accordingly, the radial rib 126 may coincide with Q-axis.

In some examples, the radial rib 126 may extend from the inner core toward the outer are with respect to the radial direction. The extension ribs 127 may dividedly extend from the radial-direction end of the radial rib 126 to be connected with the outer core 121. Accordingly, the radial rib 126 may be formed in the inner area of the extension ribs 127 with respect to the radial direction.

A circumferential-direction center of the radial rib 126 may coincide with a circumferential-direction center of the permanent magnet 125. For example, the radial rib 126 is formed to coincide with Q-axis, and the extension ribs 127 extend from the radial rib 126 toward circumferential sides.

The circumferential-direction width, in other words, the thickness of the radial rib 126 may be larger than the thickness (H) of the extension rib 127. The outer core 121 and the inner core 122 are connected with each other by one radial rib 126 and the two extension ribs 127 to support. At this time, a difference between the radial rib 126 and the extension ribs 127 in the shape and the thickness may secure the mechanical rigidity and minimize the leakage flux.

The radial rib 126 becomes thicker and thicker toward the inner core 122. For example, a round 126a or chamfer may be formed in each side of the radial rib 126. The circumferential width of the radial rib 126 may be increased by the round 126a or the chamfer. Accordingly, the connected area between the radial rib 126 and the inner core 122 to which twisting is applied becomes thicker enough to enhance the mechanical rigidity more. Similarly, the two extension ribs 127, not one extension rib, are provided in the area between the outer rotor core 121 and the extension ribs 127 to which the twisting is applied. Accordingly, the stress caused by the twisting may be dispersed.

As shown in FIG. 9, the extension ribs 127 and the radial rib 126 may be formed in a Y-shape. For example, the extension ribs 127 may extend from one radial rib 126. Such the shape of the extension ribs 127 may form a middle gap 128 between the extension ribs 127 and the radial rib 126. Accordingly, the angle formed between the extension ribs 127 and the radial rib 126 is larger than 90 degrees. The extension ribs 127 are provided in an outer area with respect to a radial direction of the radial rib 126. Also, the radial rib 126 is spaced a preset distance apart from the loading slot where the permanent magnet is loaded not to contact with the permanent magnet.

A supporting projection 129 may be formed in the end of the extension rib 127, in other words, a radial outer end. The supporting projections 129 may support radial inner ends of the permanent magnets 125 and the two supporting projections 129 may not be connected with each other. The two supporting projections 129 may be independently provided so that an opening is formed between the supporting projections 129 and the middle gap 128 formed by the extension ribs 127 may define the closed space in the radial inner area of the permanent magnet 125.

The supporting projections and the extension ribs 127 are located in both sides of one permanent magnet, respectively. The supporting projection and the extension rib which are formed in one side are independent from the supporting projection and the extension rib which are formed in the other side. For example, the supporting projections 129 supporting the permanent magnet are not directly connected with the extension ribs 127 but spaced a preset distance apart from the extension ribs 127. Such a distance may be the middle gap 128 mentioned above.

Accordingly, the shortest magnetic flux leakage passage may be blocked effectively and the moving passage of the leakage flux may become longer so that the magnetic resistance may be increased and that local magnetic flux saturation of the rotor core may be generated to reduce the quantity of the leakage flux.

The damage to the rotor core caused by the leakage flux may be reduced and the counter-electro-motive force of the motor may be improved effectively. As a result, it may be possible to design a compact motor with the same output, and the motor may be capable of increasing the output intensity and decreasing damage and the manufacturing cost.

The rotor cores having the polarities facilitated by the Y-shaped inner diameter connecting portion located on Q-axis are connected with each other, so that the mechanical rigidity may be reinforced by the centrifugal force generated by the driving motor and the rotor deformation and damage may be prevented.

As mentioned above, the rotor core may be formed by the blanking of the electric steel plate in which it is limited to reduce the thickness. For example, it is limited to reduce the thickness of the extension ribs 127 for increasing the magnetic flux resistance. In the process of the blanking, the ribs might be damaged. Accordingly, the minimum thickness may be predetermined.

The thickness (H) of the extension rib 127 may be preset as the minimum thickness, and the thickness (F) of the supporting projection 129 may be also preset as the minimum thickness. In addition, the circumferential thickness (E) of the area between the loading slot, in which the radial direction inner end of the permanent magnet 125 is loaded, and the inner gap may be preset as the minimum thickness. Accordingly, H, F and E may have the same thickness value and the value may be the minimum value required to fabricate the rotor more. The thicknesses and widths may be preset as the allowable minimum value, when the rotor core is formed by the blanking of electric steel plates.

Figure 10:
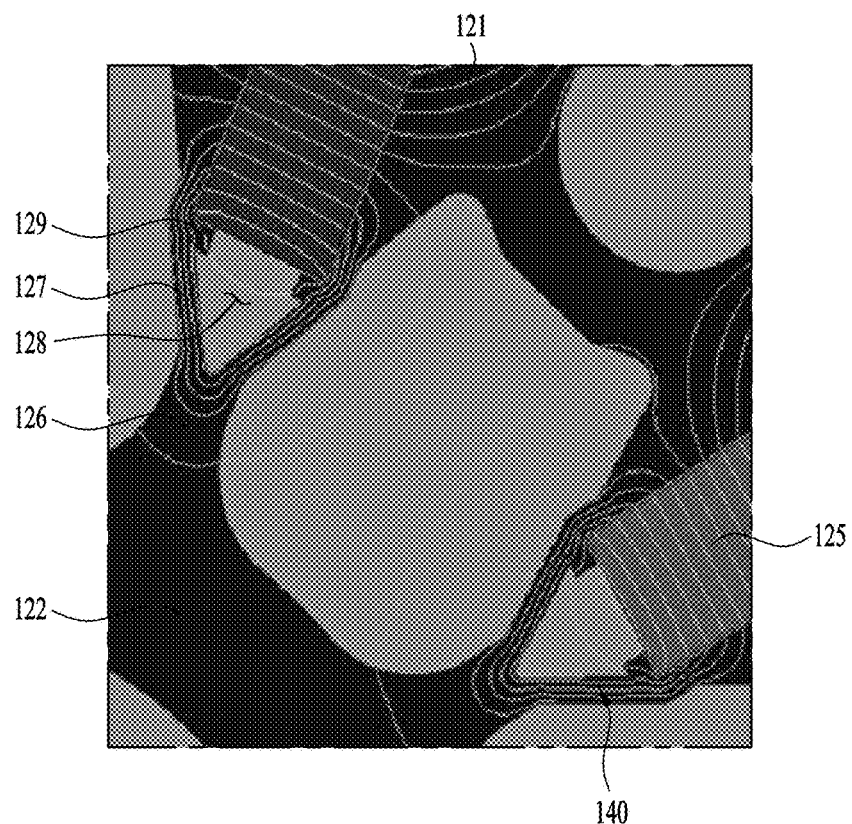
FIG. 10 illustrates a diagram of example magnetic flux in the motor shown in FIG. 8.
Figure 11:
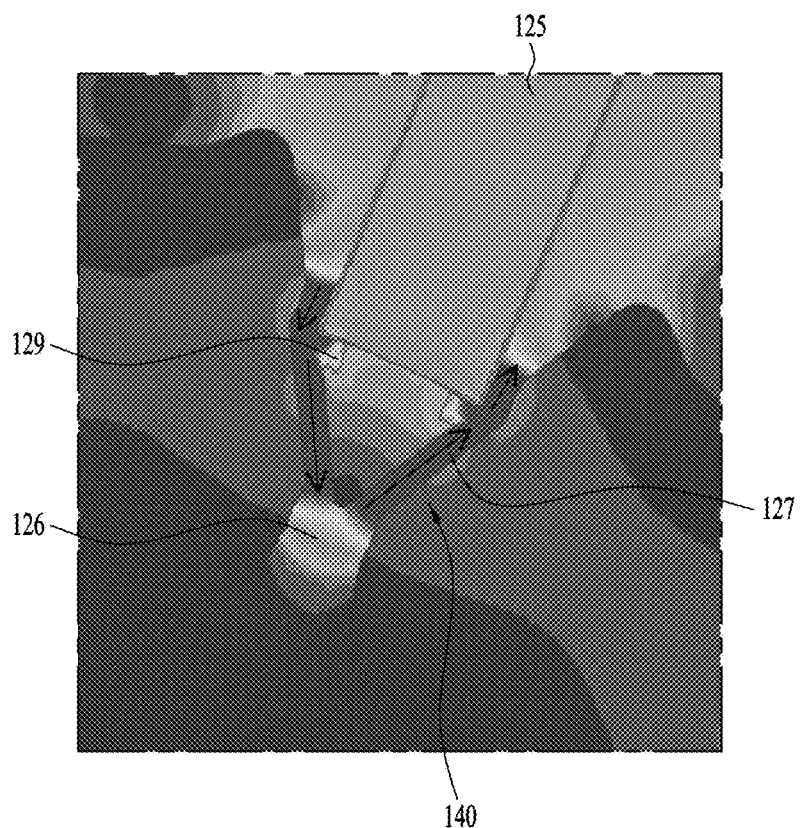
FIG. 11 illustrates an example saturation degree of the magnetic flux in the motor shown in FIG. 8.

FIG. 10 illustrates a diagram of magnetic flux in the motor shown in FIG. 8 FIG. 11 illustrates a saturation degree of the magnetic flux in the motor shown in FIG. 8.

The inner diameter connecting portion 140, especially, the radial rib may be located on Q-axis. The supporting projections 129 are provided in the ends of the Y-shaped extension ribs 127 extend from both sides of the radial rib 126. The supporting projections are provided in the radial inner ends of the permanent magnet 125 and independent from each other so that the leakage flux moving passage between them may be blocked. The extension ribs 127 thinner than the radial rib 126 may reduce the magnetic flux moving area and increase the magnetic resistance only to generate the magnetic flux saturation in most area of the leakage flux moving passage. Accordingly, the generated magnetic flux saturation may reduce the quantity of the leakage flux.

For instance, the magnetic flux in the inner diameter connecting portion 140 flows to the inner area with respect to the radial direction along one extension rib 127 and then to the outer area with respect to the radial direction along the other extension rib 127. As shown in FIG. 11, the magnetic flux saturation is generated in most areas of the magnetic flux passage, except a narrower area. For example, the magnetic flux is saturated in most areas of the passage, except some area of the radial rib 126, which may minimize the leakage flux.

Hereinafter, referring to FIG. 12, a motor in accordance with another implementation will be described in detail.

The motor in accordance with the illustrated implementation has the same structure with the motor described referring to FIG. 9, except the shape and structure of the inner diameter connecting portion. The repeated features are omitted accordingly. The permanent magnet 225, the loading slot 224, the outer core 221, the inner core 222, the shaft hole 223, the connecting portion gap 231, the round or chamfer 226a, and the other components may correspond to those provided in the motor disclosed above in the first implementation.

Even in the implementation, the inner diameter connecting portion 240 includes the radial rib 226 and the extension rib 227. The extension rib 227 is extended in a circumferential direction, not in the circumferential direction and a radial direction as mentioned in the above implementation. For example, the extension ribs 227 may extend to both sides in the circumferential direction from the outer area with respect to the radial direction of the radial rib 226. The extension ribs 227 are extended to both sides in a perpendicular direction with respect to the radial rib 226.

The extension ribs 227 may support the radial-direction end of the permanent magnet. For example, they may support not a predetermined area but the entire area of the radial-direction end of the permanent magnet. Accordingly, the loading slot 224 for loading the permanent magnet may be formed in the extension ribs 227 and the middle gap may be omitted in this implementation. The extension ribs 227 of this implementation may be the supporting projections of the above implementation connected with each other.

The radial width, in other words, the thickness of the extension rib 227 may be smaller than the thickness of the radial rib 226. The extension ribs 227 may extend in a direction perpendicular to the radial direction. For example, the extension ribs may be perpendicular to the radial rib, which may shorten the magnetic circuit. This example distinguishes from the related art and the example mentioned above.

In some examples, the radial rib 226 and the extension ribs 227 may form a T shape. A central column of the T-shape may be corresponding to the radial rib and an upper roof may be corresponding to the extension ribs. Accordingly, the radial rib may not be extended to the permanent magnet and the radial rib may be located in the outer area with respect to the radial direction of the extension ribs.

Figure 12:
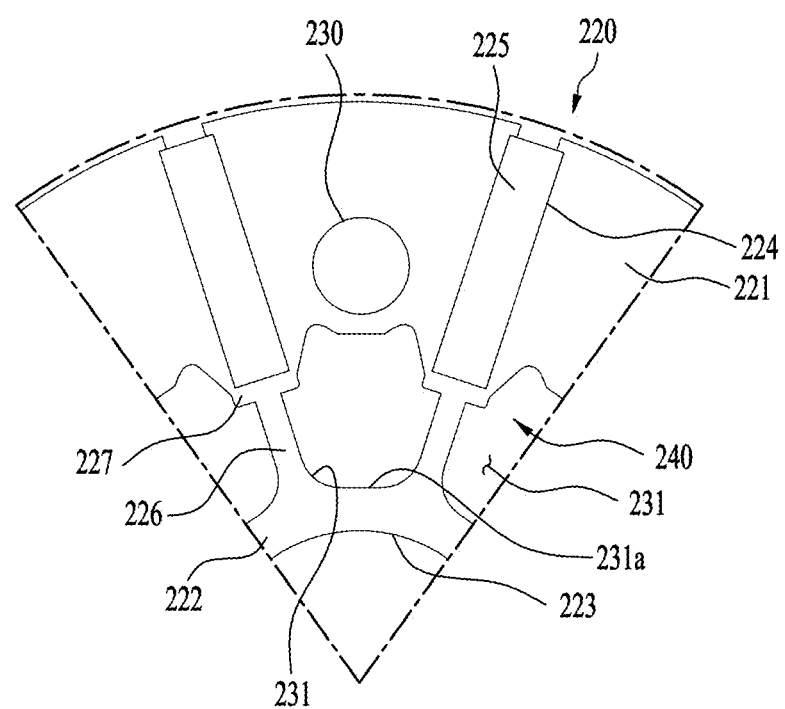
FIG. 12 is an enlarged view of an example rotor provided in an example motor according to another implementation of the present disclosure.
Figure 13:
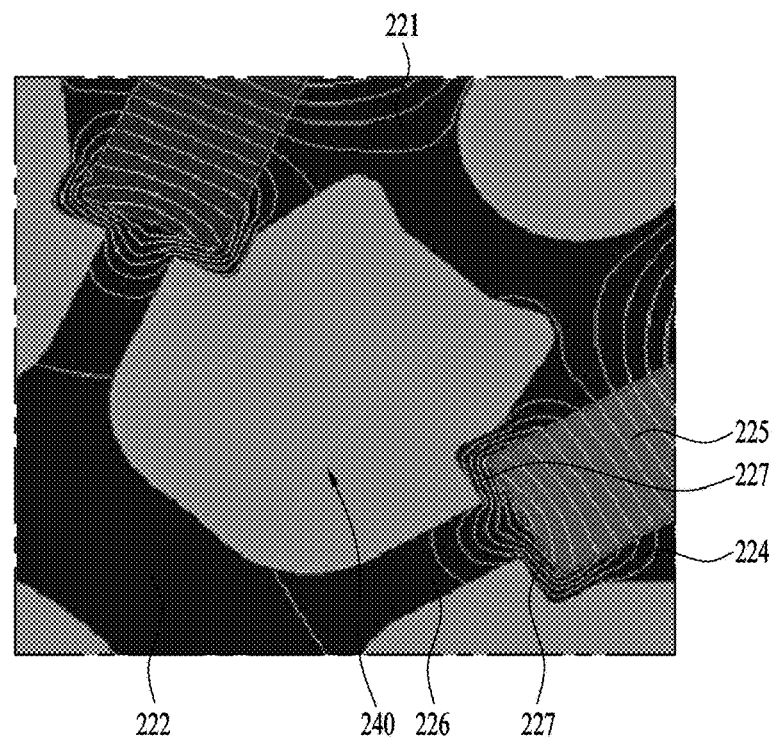
FIG. 13 illustrates a diagram of example magnetic flux in the motor shown in FIG. 12.
Figure 14:
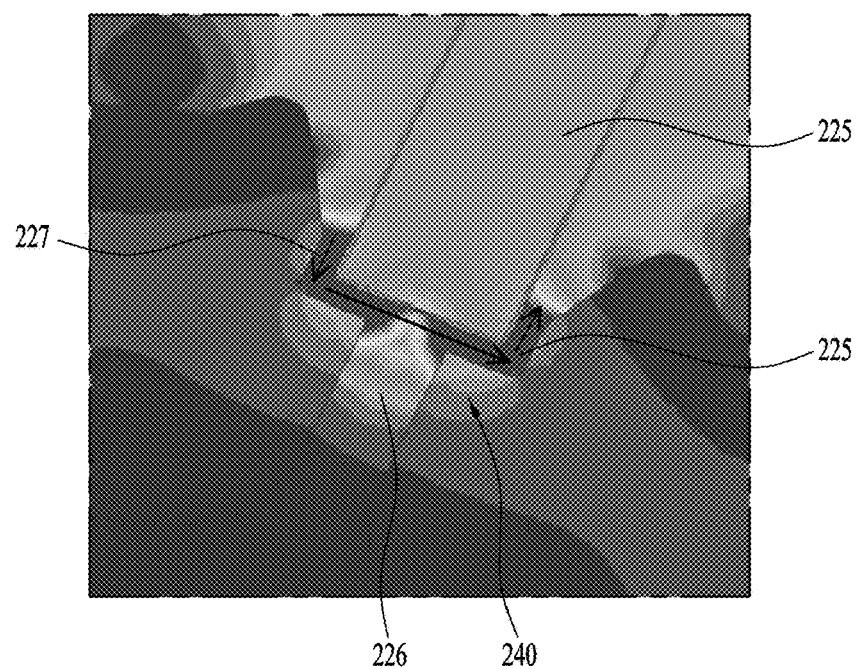
FIG. 14 illustrates a saturation degree of the magnetic flux in the motor shown in FIG. 12.

FIG. 13 illustrates a diagram of magnetic flux in the motor shown in FIG. 12 and FIG. 14 illustrates a saturation degree of the magnetic flux in the motor shown in FIG. 12.

Even though the magnetic circuit becomes short as shown in the drawings, magnetic flux saturation is generated in most areas of the leakage flux moving passage. For example, the magnetic flux flows from one extension rib 227 to the other extension rib 227 after passing the radial rib 226.

Compared with the implementation mentioned above, this implementation shows that the mechanical rigidity by the centrifugal force is relatively low while the mechanical rigidity by the twisting is reinforced more. That is because the twisting stress is substantially applied to the thickness of the radial rib 226. The thickness of the radial rib 226 may be increased and the thickness of the extension ribs may be reduced.

In the implementations mentioned above, the angle between the radial rib and the extension ribs is very important. For example, the angle may be greater than or equal to 90 degrees. The second implementation discloses that the angle is 90 degrees. The first implementation discloses that the angle is more than 90 degrees.

In some implementations, the radial rib is located in the inner area with respect to the radial direction, compared to the extension ribs. If at least a predetermined area of the radial rib is located in the outer area with respect to the radial direction, the magnetic flux flows to this area, and magnetic flux saturation may not be generated. For example, whether the radial rib is a portion of the magnetic flux passage or excluded from the passage, the magnetic flux saturation should be generated as much as possible.

Figure 1:
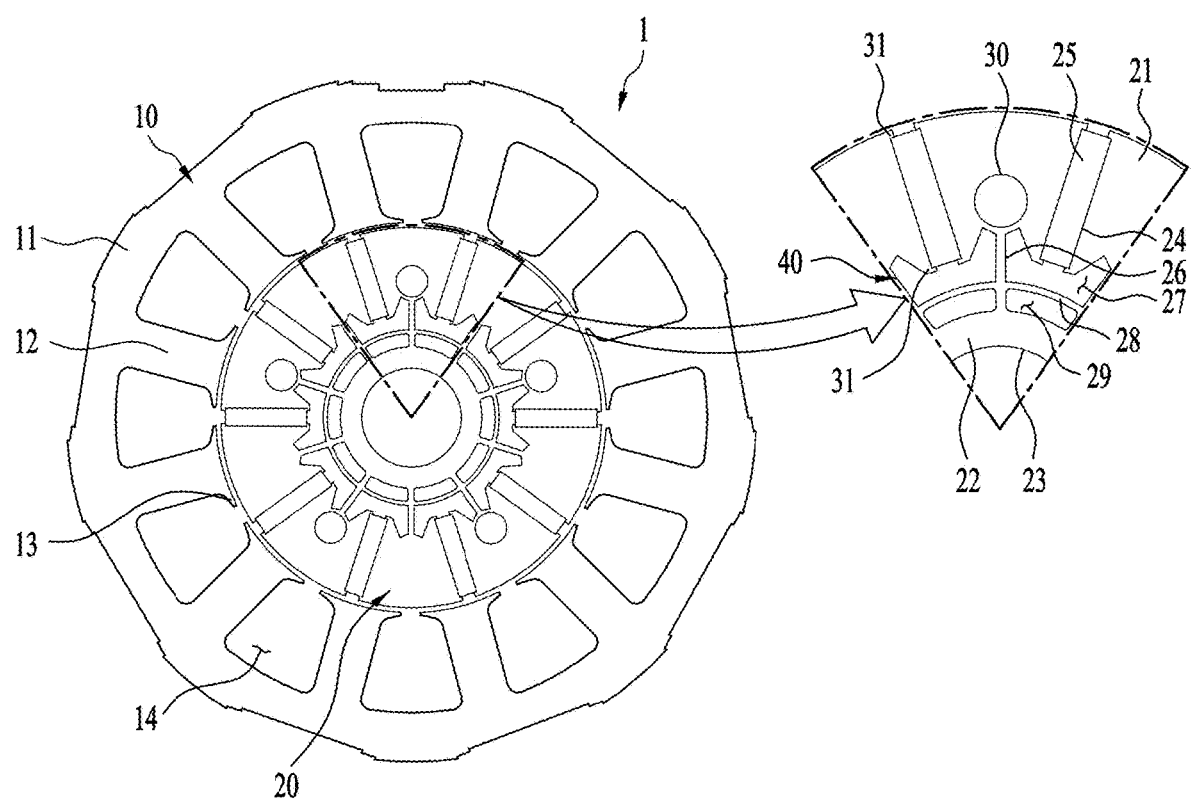
FIG. 1 illustrates an example spoke type permanent magnet motor in a related art.
Figure 2:
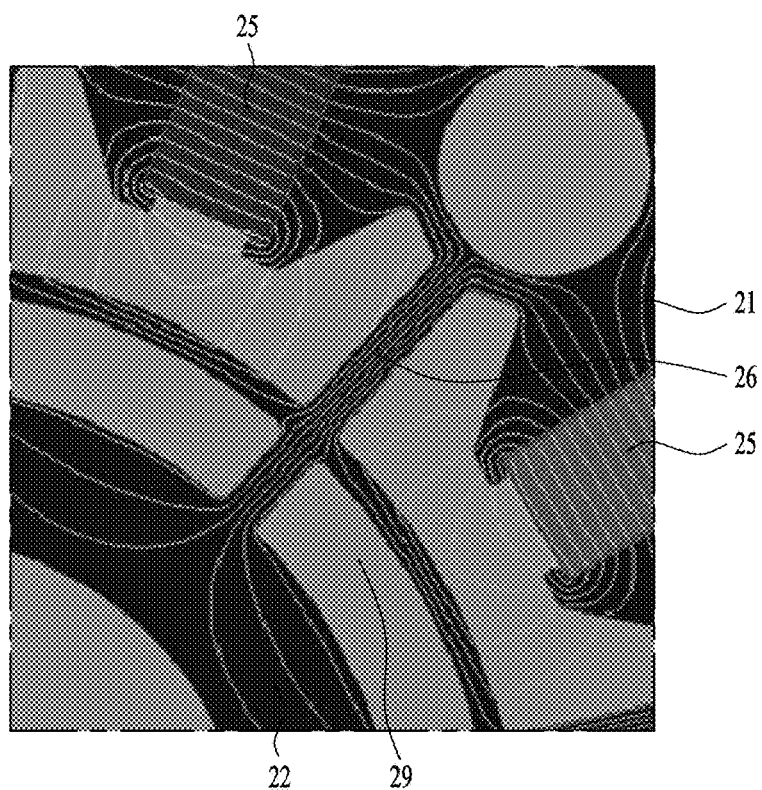
FIG. 2 illustrates a diagram of example magnetic flux in the motor shown in FIG.
Figure 3:
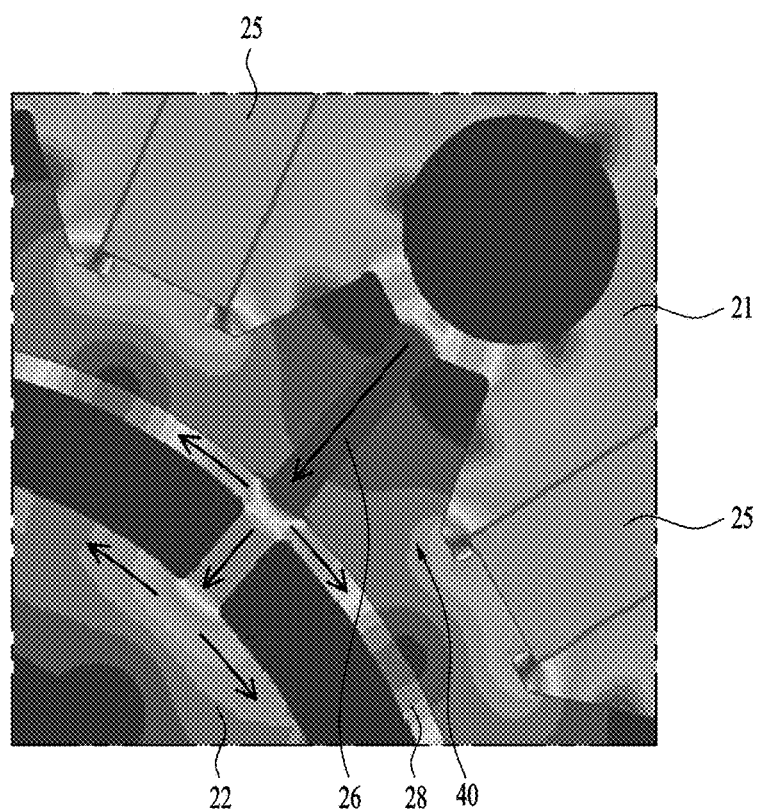
FIG. 3 illustrates a saturation degree of the magnetic flux in the motor shown in FIG. 1.
Figure 4:
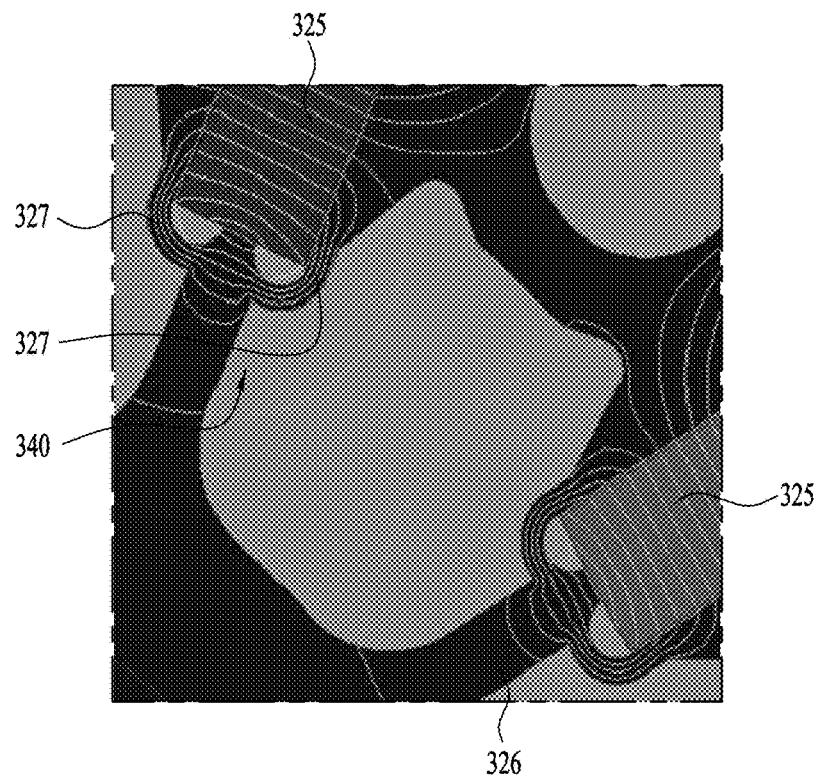
FIG. 4 illustrates a diagram of example magnetic flux in a motor in a related art.
Figure 5:
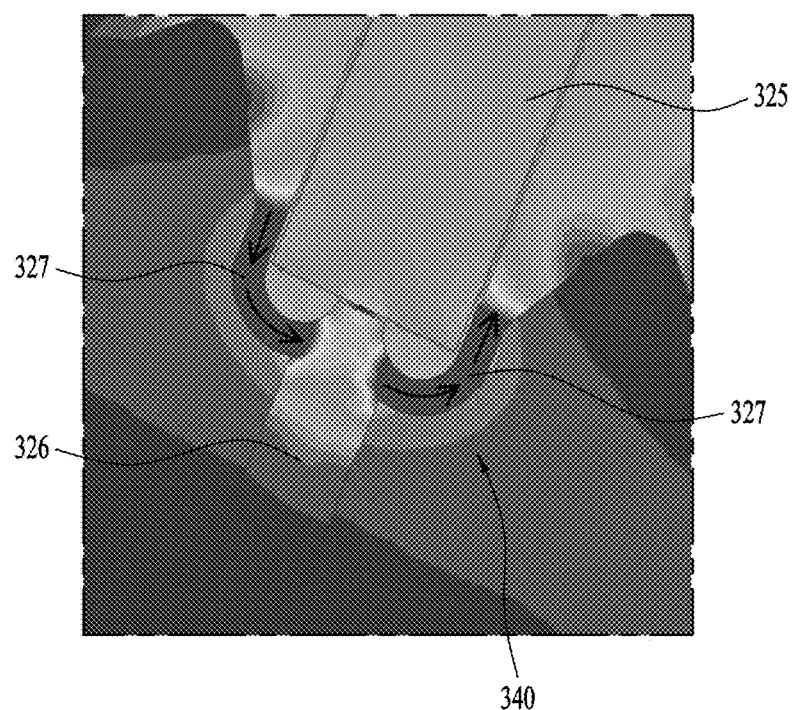
FIG. 5 illustrates a saturation degree of the magnetic flux in the motor of FIG. 4.
Figure 6:
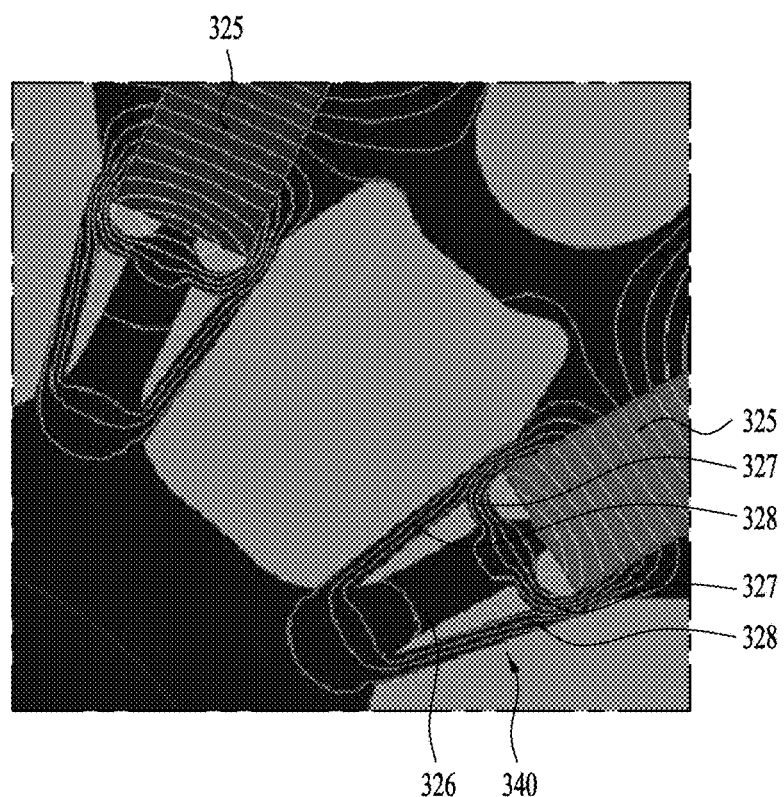
FIG. 6 illustrates a diagram of magnetic flux in a motor in another related art.
Figure 7:
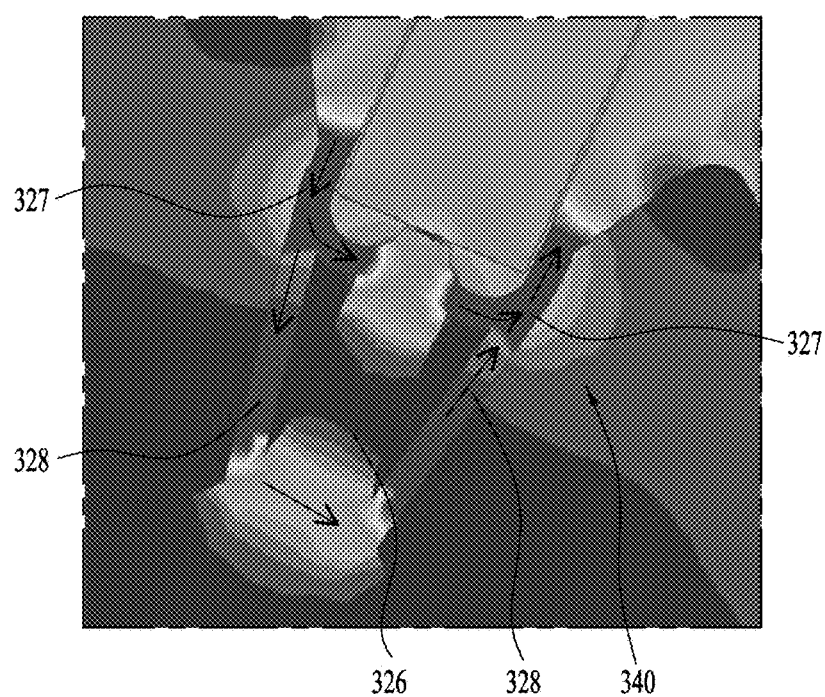
FIG. 7 illustrates a saturation degree of the magnetic flux in the motor of FIG. 6.

The result of the comparison between the performance of the motor shown in FIG. 12 and the performance of the motor shown in FIG. 1 will be described.

In the conventional motor, the counter-electro-motive force is approximately 42.9. In the motor of the implementations of the present disclosure, the counter-electro-motive force is approximately 46.32. Approximately 8% of the increased counter-electro-motive force may be gained, and thus the performance of the motor is improved.

Moreover, the thickness of the radial rib in the conventional motor is 0.8 mm. The thickness of the radial rib in the motor of the implementations is 1.2 mm, which provide a more stable structure.

When the load is driven at a twisting torque of 3.5 Nm, the maximum stress is 17.4 Mpa, and a safety factor is 15.9. In the example motor of the present disclosure, the maximum stress is 4.8 Mpa, and a safety factor is 57.9.

As a result, the performance and structural safety of the motor may be improved by changing the structure, shape, and location of the inner diameter connecting portion, with the other same conditions.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A motor comprising:
   a stator;
   a rotor comprising an outer rotor core that includes a plurality of magnets arranged along a circumferential direction of the rotor;
   an inner rotor core that is located radially inward of the outer rotor core and that defines a shaft hole configured to receive a shaft; and
   an inner connecting portion that connects the outer rotor core to the inner rotor core and that is located at a central axis of a magnet from among the plurality of magnets,
   wherein the inner connecting portion comprises:
   a radial rib that extends from the inner rotor core radially outward toward the outer rotor core, and
   an extension rib that extends from an outer end of the radial rib in the circumferential direction and that defines an angle with respect to the radial rib that is greater than or equal to 90 degrees, wherein the outer rotor core further defines (i) a plurality of loading slots configured to receive the plurality of magnets, respectively, and (ii) a gap between two neighboring loading slots of the plurality of loading slots in the circumferential direction of the rotor, wherein the inner connecting portion includes a plurality of connecting portions that are arranged along the circumferential direction and that define a connecting portion gap between the plurality of connecting portions, the connecting portion gap being spaced apart from the gap that is defined between the two neighboring loading slots, wherein each of the plurality of connecting portions includes a round corner that extends from the outer end of the radial rib to the inner rotor core and that defines a portion of the connecting portion gap adjacent to the inner rotor core.

2. The motor of claim 1, wherein the radial rib is located radially inward of the extension rib and extends along a radial direction of the rotor.

3. The motor of claim 2, wherein an entire area of the radial rib is located radially inward of the extension rib, and
wherein the outer rotor core, the extension rib, the radial rib, and the inner rotor core are arranged along the radial direction in order.

4. The motor of claim 3, wherein the outer rotor core, the extension rib, the radial rib, and the inner rotor core are integrally formed of a same material.

5. The motor of claim 4, wherein a width of the radial rib in the circumferential direction is greater than a width of the extension rib in the circumferential direction or a thickness of the extension rib in the radial direction.

6. The motor of claim 1, wherein the inner connecting portion has a Y-shape, and
wherein the extension rib branches from the outer end of the radial rib in a first side of the radial rib and in a second side of the radial rib opposite to the first side.

7. The motor of claim 6, wherein the inner connecting portion further comprises a supporting projection that protrudes from an outer end of the extension rib and that is configured to support the magnet.

8. The motor of claim 7, wherein the supporting projection includes a plurality of projections, each projection being configured to support the magnet, and
wherein the inner connecting portion further comprises a middle gap defined by the extension rib, the supporting projection, and a surface of the magnet.

9. The motor of claim 8, wherein a width of the radial rib in the circumferential direction increases along a radial direction toward the inner rotor core.

10. The motor of claim 9,
wherein a distance between the round corners across the connecting portion gap decreases as the radial rib extends from the outer end of the radial rib to the inner rotor core.

11. The motor of claim 10, wherein a distance between one of the plurality of loading slots and the connecting portion gap is equal to a thickness of the supporting projection in the radial direction, and to a width of the extension rib in the circumferential direction.

12. The motor of claim 1, wherein the inner connecting portion has a T shape, and
wherein the extension rib branches from the outer end of the radial rib in a first direction orthogonal to the radial rib and in a second direction opposite to the first direction.

13. The motor of claim 12, wherein the extension rib is configured to cover an inner area of the magnet, and define a portion of one of the plurality of loading slots.

14. The motor of claim 13, wherein a width of the radial rib in the circumferential direction increases along a radial direction toward the inner rotor core.

15. The motor of claim 14,
wherein the width of the radial rib increases toward the inner rotor core based on a decrease of a distance between the round corners across the connecting portion gap.

16. The motor of claim 15, wherein a distance between one of the plurality of loading slots and the connecting portion gap is equal to a thickness of the extension rib in the radial direction.

17. The motor of claim 1, wherein the connecting portion gap is located inward of the gap in a radial direction of the rotor.

18. The motor of claim 17, wherein the connecting portion gap and the gap are arranged along the radial direction of the rotor.

19. The motor of claim 1, wherein a width of the radial rib in the circumferential direction increases as the radial rib extends from the outer end of the radial rib to the inner rotor core along the round corner.

20. The motor of claim 1, wherein the outer end of the radial rib is a distal end that is spaced apart from the magnet in a radial direction and that is connected to an inner end of the extension rib.

* * * * *